United States Patent
Wang

(10) Patent No.: US 10,098,078 B2
(45) Date of Patent: Oct. 9, 2018

(54) METHOD FOR DETERMINING MAXIMUM TRANSMIT POWER, TERMINAL, AND BASE STATION

(71) Applicant: Huawei Technologies Co., Ltd., Shenzhen (CN)

(72) Inventor: Jian Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/507,675

(22) PCT Filed: Aug. 29, 2014

(86) PCT No.: PCT/CN2014/085600
§ 371 (c)(1),
(2) Date: Feb. 28, 2017

(87) PCT Pub. No.: WO2016/029460
PCT Pub. Date: Mar. 3, 2016

(65) Prior Publication Data
US 2017/0289928 A1    Oct. 5, 2017

(51) Int. Cl.
| | |
|---|---|
| *H04B 1/00* | (2006.01) |
| *H04B 7/00* | (2006.01) |
| *H04B 1/04* | (2006.01) |
| *H04W 52/36* | (2009.01) |
| *H04W 52/14* | (2009.01) |

(52) U.S. Cl.
CPC ....... *H04W 52/367* (2013.01); *H04W 52/146* (2013.01)

(58) Field of Classification Search
CPC .......................... H04W 52/367; H04W 52/146

USPC ........................................ 455/522, 69, 127.1
See application file for complete search history.

(56) References Cited

U.S. PATENT DOCUMENTS 8,249,641 B1 * 8/2012 Khanka ............... H04W 52/143
455/517
8,538,474 B2    9/2013 Chen et al.
(Continued)

FOREIGN PATENT DOCUMENTS

| CN | 102131279 A | 7/2011 |
|---|---|---|
| CN | 103329602 A | 9/2013 |

OTHER PUBLICATIONS

3rd Generation Partnership Project; Technical Specification Group Radio Access Networks; Band 14 Public Safety Broadband High Power User Equipment (UE) for Region 2; (Release 11), 3GPP TR 36.837 V0.3.0 (Aug. 2012), 132 pages.

(Continued)

*Primary Examiner* — Tilahun B Gesesse
(74) *Attorney, Agent, or Firm* — Slater Matsil, LLP

(57) ABSTRACT

A method is provided. The method includes receiving, by a terminal, N configuration parameters sent by a base station. The method also includes, when feature information indicated by the N configuration parameters comprises feature information of the terminal, determining, by the terminal, a maximum transmit power of the terminal according to at least a nominal transmit power corresponding to the feature information of the terminal and a limiting power indicated by a configuration parameter corresponding to the feature information of the terminal.

20 Claims, 6 Drawing Sheets

(56) References Cited

U.S. PATENT DOCUMENTS

| | | | |
|---|---|---|---|
| 8,594,028 B2* | 11/2013 | Mark | H04W 52/143 |
| | | | 370/329 |
| 9,055,565 B2 | 6/2015 | Kim et al. | |
| 2007/0042799 A1 | 2/2007 | Jubin et al. | |
| 2009/0042593 A1 | 2/2009 | Yavuz et al. | |
| 2010/0093386 A1* | 4/2010 | Damnjanovic | H04W 52/04 |
| | | | 455/522 |
| 2010/0142458 A1* | 6/2010 | Mark | H04W 52/143 |
| | | | 370/329 |
| 2011/0256884 A1* | 10/2011 | Kazmi | H04W 48/04 |
| | | | 455/456.1 |
| 2012/0202512 A1 | 8/2012 | Braithwaite | |

OTHER PUBLICATIONS

Intel Corporation, "Connected Mode Procedures and RRC Signaling of WLAN/3GPP Radio Interworking for LTE," Change Request, 3GPP TSG-RAN WG2 Meeting #87, R2-144021, Dresden, Germany, Aug. 18-22, 2014, 29 pages.

3rd Generation Partnership Project; Technical Specification Group Radio Access Network; Evolved Universal Terrestrial Radio Access (E-UTRA); User Equipment (UE) Radio Transmission and Reception (Release 8), 3GPP TS 36.101 V8.23.0 (Dec. 2013), 171 pages.

* cited by examiner

102 — A terminal receives N configuration parameters sent by a base station, where each of the configuration parameters is used to indicate a limiting power corresponding to one type of feature information, the feature information is used to indicate a power level or a service type, and N is not less than 1

104 — When the feature information indicated by the N configuration parameters includes feature information of the terminal, the terminal determines a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power

FIG. 1

202 — A terminal receives N configuration parameters sent by a base station, where each of the configuration parameters is used to indicate a limiting power corresponding to one type of feature information 204 — The terminal determines whether the feature information corresponding to the N configuration parameters includes feature information of the terminal 206 — Yes — The terminal determines, according to a nominal transmit power corresponding to the feature information of the terminal and a limiting power indicated by a configuration parameter corresponding to the feature information of the terminal, a maximum transmit power corresponding to the feature information of the terminal, where the maximum transmit power is not less than a lower limit of the maximum transmit power and not greater than an upper limit of the maximum transmit power 208 — No — The terminal determines a candidate limiting power according to a preset policy, and determines, according to at least the candidate limiting power and a nominal transmit power corresponding to the feature information of the terminal, a maximum transmit power corresponding to the feature information of the terminal

FIG. 2

| A base station determines N configuration parameters, where each of the configuration parameters is used to indicate a limiting power corresponding to one type of feature information, the feature information includes a power level or a service type, and N is not less than 1 | 302 |

| The base station sends the N configuration parameters to a terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power | 304 |

FIG. 3

METHOD FOR DETERMINING MAXIMUM TRANSMIT POWER, TERMINAL, AND BASE STATION

CROSS-REFERENCE TO RELATED APPLICATIONS

This application is a National Stage of International Application No. PCT/CN2014/085600, filed Aug. 29, 2014, which is hereby incorporated by reference in its entirety.

TECHNICAL FIELD

The present invention relates to the field of wireless communications technologies, and in particular, to a method for determining a maximum transmit power, a terminal, and a base station.

BACKGROUND

In a wireless communications system, a higher transmit power, with which user equipment (UE) sends an uplink signal to a base station, indicates a longer transmission distance of the uplink signal, and correspondingly, the uplink signal has greater interference in the base station.

A nominal transmit power $P_1$ of UE is determined by a power level corresponding to a hardware capability of the UE, and $P_1$ is a maximum power that can be used by the UE to send an uplink signal. To extend a transmission distance of the uplink signal as much as possible and reduce interference from the uplink signal to the base station as much as possible, usually a maximum transmit power Px of the UE needs to be further limited below $P_1$.

The base station sets a limiting power $P_2$ in advance according to the power level of the UE, and sends the limiting power $P_2$ to the UE. The UE determines Px according to the limiting power $P_2$, where an upper limit of Px does not exceed a smaller value between $P_1$ and $P_2$. For example, in a communications system, a power level of UE is class 3, and a corresponding nominal transmit power $P_1$ is 23 dBm. The base station may set a limiting power $P_2$ to 20 dBm, and delivers the limiting power $P_2$ to the UE within a communication range of the base station. The UE determines an upper limit and a lower limit of a maximum transmit power Px according to the limiting power $P_2$, where the upper limit of Px does not exceed 20 dBm.

In the prior art, an expected effect, that is, extending the transmission distance of the uplink signal as much as possible and reducing interference from the uplink signal to the base station as much as possible, can be achieved only when the base station sets limiting powers for multiple UEs having a same power level.

SUMMARY

Embodiments of the present invention provide a method for determining a maximum transmit power, a terminal, and a base station, so as to implement that an expected effect, that is, extending a transmission distance of an uplink signal as much as possible and reducing interference from the uplink signal to the base station as much as possible, is still achieved when the base station sets limiting powers for multiple UEs having different feature information (for example, power levels or service types).

According to a first aspect, a method for determining a maximum transmit power is provided. The method includes: receiving, by a terminal, N configuration parameters sent by a base station, where each of the configuration parameters is used to indicate a limiting power corresponding to one type of feature information, the feature information includes a power level or a service type, and N is not less than 1. The method also includes, when the feature information indicated by the N configuration parameters includes feature information of the terminal, determining, by the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

In a first possible implementation manner of the first aspect, the method further includes: when the feature information corresponding to the N configuration parameters does not include the feature information of the terminal, determining, by the terminal, a candidate limiting power according to a preset policy; and determining, by the terminal, the maximum transmit power according to at least the candidate limiting power and the nominal transmit power corresponding to the feature information of the terminal.

With reference to the first possible implementation manner of the first aspect, in a second possible implementation manner of the first aspect, the determining a candidate limiting power according to a preset policy includes: determining that the nominal transmit power corresponding to the feature information of the terminal is the candidate limiting power.

With reference to the second possible implementation manner of the first aspect, in a third possible implementation manner of the first aspect, the lower limit of the maximum transmit power is Pi, and the upper limit of the maximum transmit power is Pj, where $Pi=P_1-\max(M_1+M_2+\Delta T_1+\Delta T_2, M_3)$, $Pj=P_1$, $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

With reference to the first possible implementation manner of the first aspect, in a fourth possible implementation manner of the first aspect, the determining a candidate limiting power according to a preset policy includes: determining that the candidate limiting power is 0.

With reference to the fourth possible implementation manner of the first aspect, in a fifth possible implementation manner of the first aspect, the determining, by the terminal, the maximum transmit power according to at least the candidate limiting power and the nominal transmit power corresponding to the feature information of the terminal includes: determining, by the terminal, that the maximum transmit power is 0.

With reference to the first possible implementation manner of the first aspect, in a sixth possible implementation manner of the first aspect, the determining a candidate limiting power according to a preset policy includes: determining that one of the limiting powers corresponding to the N configuration parameters is the candidate limiting power.

With reference to the sixth possible implementation manner of the first aspect, in a seventh possible implementation manner of the first aspect, the determining that one of the limiting powers corresponding to the N configuration parameters is the candidate limiting power includes: determining that a lowest power among the limiting powers corresponding to the N configuration parameters is the candidate limiting power; or when the feature information includes power levels, determining that a limiting power corresponding to a lowest power level among the limiting powers corresponding to the N configuration parameters is the candidate limiting power.

With reference to the first possible implementation manner of the first aspect, in an eighth possible implementation manner of the first aspect, the determining a candidate limiting power according to a preset policy includes: when the feature information includes power levels, selecting a specified power level from the power levels corresponding to the N configuration parameters; and determining that a nominal transmit power corresponding to the specified power level is the candidate limiting power.

With reference to the eighth possible implementation manner of the first aspect, in a ninth possible implementation manner of the first aspect, the selecting a specified power level from the power levels corresponding to the N configuration parameters includes: selecting a lowest power level among the limiting powers corresponding to the N configuration parameters as the specified power level.

In a tenth possible implementation manner of the first aspect, the lower limit of the maximum transmit power is Pi', and the upper limit of the maximum transmit power is Pj', where $$Pi'=\min\{P_2-\Delta T_2, P_1-\max(M_1+M_2+\Delta T_1+\Delta T_2, M_3)\};$$
and $$Pj'=\min\{P_2, P_1\},$$

where $P_1$ is the nominal transmit power corresponding to the feature information of the terminal, $P_2$ is the limiting power indicated by the configuration parameter corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

According to a second aspect, a method for determining a maximum transmit power is provided. The method includes: determining, by a base station, N configuration parameters, where each of the configuration parameters is used to indicate a limiting power corresponding to one type of feature information, the feature information includes a power level or a service type, and N is not less than 1. The method also includes sending, by the base station, the N configuration parameters to a terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

According to a third aspect, a terminal is provided. The terminal includes: a receiving module, configured to receive N configuration parameters sent by a base station, where each of the configuration parameters is used to indicate a limiting power corresponding to one type of feature information, the feature information includes a power level or a service type, and N is not less than 1. The terminal also includes a first determining module, configured to: when the feature information indicated by the N configuration parameters includes feature information of the terminal, determine a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

In a first possible implementation manner of the third aspect, the terminal further includes: a second determining module, when the feature information corresponding to the N configuration parameters does not include the feature information of the terminal, determine a candidate limiting power according to a preset policy; and a third determining module, configured to determine the maximum transmit power according to at least the candidate limiting power and the nominal transmit power corresponding to the feature information of the terminal.

With reference to the first possible implementation manner of the third aspect, in a second possible implementation manner of the third aspect, the second determining module includes: a first determining submodule, configured to determine that the nominal transmit power corresponding to the feature information of the terminal is the candidate limiting power.

With reference to the second possible implementation manner of the third aspect, in a third possible implementation manner of the third aspect, the lower limit of the maximum transmit power is Pi, and the upper limit of the maximum transmit power is Pj, where $Pi=P_1-\max(M_1+M_2+\Delta T_1+\Delta T_2, M_3)$, $Pj=P_1$, $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

With reference to the first possible implementation manner of the third aspect, in a fourth possible implementation manner of the third aspect, the second determining module includes: a second determining submodule, configured to determine that the candidate limiting power is 0.

With reference to the fourth possible implementation manner of the third aspect, in a fifth possible implementation manner of the third aspect, the third determining module includes: a third determining submodule, configured to determine that the maximum transmit power is 0.

With reference to the first possible implementation manner of the third aspect, in a sixth possible implementation manner of the third aspect, the second determining module includes: a fourth determining submodule, configured to determine that one of the limiting powers corresponding to the N configuration parameters is the candidate limiting power.

With reference to the sixth possible implementation manner of the third aspect, in a seventh possible implementation manner of the third aspect, the fourth determining submodule includes: a first determining unit or a second determining unit, where the first determining unit is configured to determine that a lowest power among the limiting powers corresponding to the N configuration parameters is the candidate limiting power; and the second determining unit is configured to: when the feature information includes power levels, determine that a limiting power corresponding to a lowest power level among the limiting powers corresponding to the N configuration parameters is the candidate limiting power.

With reference to the first possible implementation manner of the third aspect, in an eighth possible implementation manner of the third aspect, the second determining module includes: a selection submodule, configured to: when the feature information includes power levels, select a specified power level from the power levels corresponding to the N configuration parameters; and a fifth determining submodule, configured to determine that a nominal transmit power corresponding to the specified power level is the candidate limiting power.

With reference to the eighth possible implementation manner of the third aspect, in a ninth possible implementation manner of the third aspect, the selection submodule is configured to select a lowest power level among the limiting powers corresponding to the N configuration parameters as the specified power level.

In a tenth possible implementation manner of the third aspect, the lower limit of the maximum transmit power is Pi', and the upper limit of the maximum transmit power is Pj', where $$Pi'=\min\{P_2-\Delta T_2, P_1-\max(M_1+M_2+\Delta T_1+\Delta T_2, M_3)\};$$
and
$$Pj'=\min\{P_2, P_1\},$$

where $P_1$ is the nominal transmit power corresponding to the feature information of the terminal, $P_2$ is the limiting power indicated by the configuration parameter corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

According to a fourth aspect, a terminal is provided. The terminal includes: a bus, and a processor, a memory and a transceiver that are connected to the bus, where the memory is configured to store instructions, and the instructions are configured to be executed by the processor. The transceiver is configured to receive N configuration parameters sent by a base station, where each of the configuration parameters is used to indicate a limiting power corresponding to one type of feature information, the feature information is used to indicate a power level or a service type, and N is not less than 1. The processor is configured to: when the feature information indicated by the N configuration parameters includes feature information of the terminal, determine a maximum transmit power of the terminal according to at least a nominal transmit power corresponding to the feature information of the terminal and a limiting power indicated by the configuration parameter corresponding to the feature information of the terminal, where the maximum transmit power is not less than a lower limit of the maximum transmit power and not greater than an upper limit of the maximum transmit power.

In a first possible implementation manner of the fourth aspect, the processor is further configured to: when the feature information corresponding to the N configuration parameters does not include the feature information of the terminal, determine a candidate limiting power according to a preset policy, and determine the maximum transmit power according to at least the candidate limiting power and the nominal transmit power corresponding to the feature information of the terminal.

With reference to the first possible implementation manner of the fourth aspect, in a second possible implementation manner of the fourth aspect, the processor is further configured to determine that the nominal transmit power corresponding to the feature information of the terminal is the candidate limiting power.

With reference to the second possible implementation manner of the fourth aspect, in a third possible implementation manner of the fourth aspect, the lower limit of the maximum transmit power is Pi, and the upper limit of the maximum transmit power is Pj, where $P_1 = P_1 - \max(M_1+M_2+\Delta T_1+\Delta T_2, M_3)$, $Pj=P_1$, $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

With reference to the first possible implementation manner of the fourth aspect, in a fourth possible implementation manner of the fourth aspect, the processor is further configured to determine that the candidate limiting power is 0.

With reference to the fourth possible implementation manner of the fourth aspect, in a fifth possible implementation manner of the fourth aspect, the processor is further configured to determine that the maximum transmit power is 0.

With reference to the first possible implementation manner of the fourth aspect, in a sixth possible implementation manner of the fourth aspect, the processor is further configured to determine that one of the limiting powers corresponding to the N configuration parameters is the candidate limiting power.

With reference to the sixth possible implementation manner of the fourth aspect, in a seventh possible implementation manner of the fourth aspect, the processor is further configured to determine that a lowest power among the limiting powers corresponding to the N configuration parameters is the candidate limiting power; or when the feature information includes power levels, the processor is further configured to determine that a limiting power corresponding to a lowest power level among the limiting powers corresponding to the N configuration parameters is the candidate limiting power.

With reference to the first possible implementation manner of the fourth aspect, in an eighth possible implementation manner of the fourth aspect, the processor is further configured to: when the feature information includes power levels, select a specified power level from the power levels corresponding to the N configuration parameters; and determine that a nominal transmit power corresponding to the specified power level is the candidate limiting power.

With reference to the eighth possible implementation manner of the fourth aspect, in a ninth possible implementation manner of the fourth aspect, the processor is further configured to select a lowest power level among the limiting powers corresponding to the N configuration parameters as the specified power level.

In a tenth possible implementation manner of the first aspect, the processor, the lower limit of the maximum transmit power is Pi', and the upper limit of the maximum transmit power is Pj', where $$Pi'=\min\{P_2-\Delta T_2, P_1-\max(M_1+M_2+\Delta T_1+\Delta T_2, M_3)\};$$
and $$Pj'=\min\{P_2, P_1\},$$

where $P_1$ is the nominal transmit power corresponding to the feature information of the terminal, $P_2$ is the limiting power indicated by the configuration parameter corresponding to the power level of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

According to a fifth aspect, a base station is provided. The base station includes: a fourth determining module, configured to determine N configuration parameters, where each of the configuration parameters is used to indicate a limiting power corresponding to one type of feature information, the feature information is used to indicate a power level or a service type, and N is not less than 1. The base station also includes a sending module, configured to send the N configuration parameters to a terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

According to a sixth aspect, a base station is provided. The base station includes: a bus, and a processor, a memory, and a transceiver that are connected to the bus, where the memory is configured to store instructions, and the instructions are configured to be executed by the processor. The processor is configured to determine N configuration parameters, where each of the configuration parameters is used to indicate a limiting power corresponding to one type of feature information, the feature information is used to indicate a power level or a service type, and N is not less than 1. The processor is further configured to control the transceiver to send the N configuration parameters to a terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

Technical solutions provided by the embodiments of the present invention bring the following beneficial effects: Receives N configuration parameters sent by a base station, and when feature information corresponding to the N configuration parameters includes feature information of the terminal, the terminal determines, according to a limiting power corresponding to the feature information of the terminal, a maximum transmit power corresponding to the feature information, which can implement an expected effect, that is, extending a transmission distance of an uplink signal as much as possible and reducing interference from the uplink signal to the base station as much as possible, is still achieved when the base station sets limiting powers for multiple UEs having different power levels or service types.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a method flowchart of a method for determining a maximum transmit power according to an embodiment of the present invention;

FIG. 2 is a method flowchart of a method for determining a maximum transmit power according to another embodiment of the present invention;

FIG. 3 is a method flowchart of a method for determining a maximum transmit power according to an embodiment of the present invention;

DETAILED DESCRIPTION OF ILLUSTRATIVE EMBODIMENTS

Figure 4:
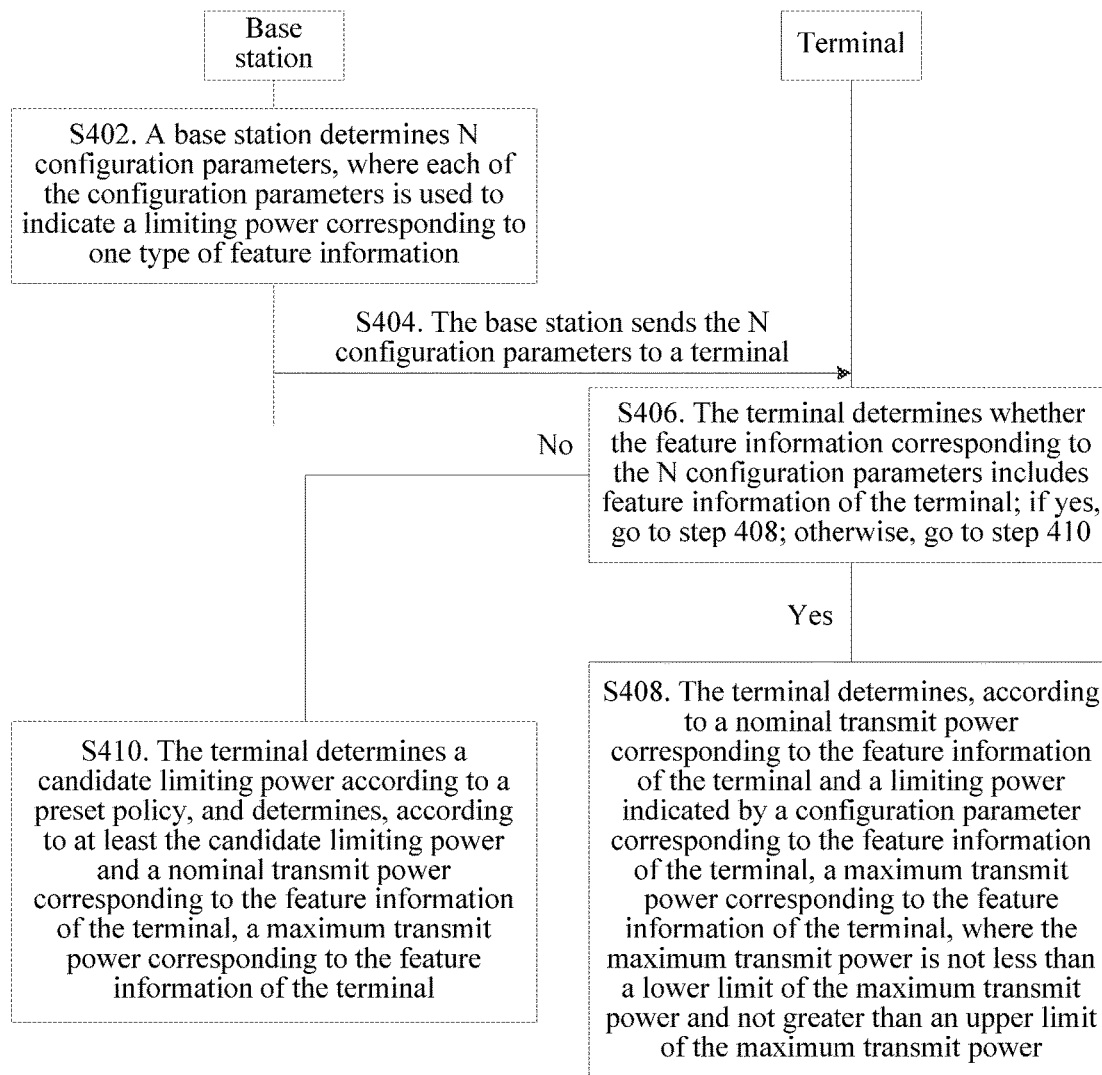
FIG. 4 is a method flowchart of a method for determining a maximum transmit power according to an embodiment of the present invention.

To make the objectives, technical solutions, and advantages of the present invention clearer, the following further describes the embodiments of the present invention in detail with reference to the accompanying drawings.

Referring to FIG. 1, FIG. 1 is a method flowchart of a method for determining a maximum transmit power according to an embodiment of the present invention. The method may be applied to a terminal, to set a maximum transmit power of the terminal. The method may include the following steps.

Step 102: The terminal receives N configuration parameters sent by a base station, where each of the configuration parameters is used to indicate a limiting power corresponding to one type of feature information, the feature information is used to indicate a power level or a service type, and N is not less than 1.

The power level of the terminal may be used to identify a value of a nominal transmit power of the terminal. For example, for a terminal whose nominal transmit power (Ppwer_class) is 31 dBm, a power level of the terminal is class 1; for a terminal whose nominal transmit power (Ppwer_class) is 23 dBm, a power level of the terminal is class 3.

The service type of the terminal includes but is not limited to: a direct-connection communication service, a large-area terminal discovery service, a medium-area terminal discovery service, and a small-area terminal discovery service.

Step 104: When the feature information indicated by the N configuration parameters includes feature information of the terminal, the terminal determines a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

It should be noted that, the nominal transmit power corresponding to the feature information of the terminal is an attribute of a capability of the terminal.

In conclusion, in the method for determining a maximum transmit power provided by this embodiment of the present invention, a terminal receives N configuration parameters sent by a base station, and when feature information corresponding to the N configuration parameters includes feature information of the terminal, the terminal determines a maximum transmit power corresponding to the feature information according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Referring to FIG. 2, FIG. 2 is a method flowchart of a method for determining a maximum transmit power according to another embodiment of the present invention. The method may be applied to a terminal, to set a maximum transmit power of the terminal. The method may include the following.

Step 202: The terminal receives N configuration parameters sent by a base station, where each of the configuration parameters is used to indicate a limiting power corresponding to one type of feature information.

The feature information is used to indicate a power level or a service type, and N is not less than 1.

The base station sets limiting powers according to N pieces of feature information in advance, uses the specified N limiting powers and the corresponding feature information as configuration parameters, and broadcasts the configuration parameters.

In this embodiment, the base station not only can set limiting powers according to power levels of terminals, but also can set limiting powers according to service types that may be used by the terminals. For example, the base station may configure a relatively high limiting power for a long-distance direct-connection communication service, and configure a relatively low limiting power for a short-distance direct-connection communication service.

Step 204: The terminal determines whether the feature information corresponding to the N configuration parameters includes feature information of the terminal; if yes, go to step 206; otherwise, go to step 208.

When the feature information corresponding to the N configuration parameters sent by the base station includes the feature information of the terminal, go to step 206, to configure a maximum transmit power according to the limiting power corresponding to the feature information of the terminal. When the feature information corresponding to the N configuration parameters sent by the base station does not include the feature information of the terminal, the method may proceed to step 208.

Step 206: The terminal determines, according to a nominal transmit power corresponding to the feature information of the terminal and a limiting power indicated by a configuration parameter corresponding to the feature information of the terminal, a maximum transmit power corresponding to the feature information of the terminal, where the maximum transmit power is not less than a lower limit of the maximum transmit power and not greater than an upper limit of the maximum transmit power.

Specifically, the lower limit of the maximum transmit power is Pi', and the upper limit of the maximum transmit power is Pj', where $$Pi'=\min\{P_2-\Delta T_2, P_1-\max(M_1+M_2+\Delta T_1+\Delta T_2, M_3)\};$$
and $$Pj'=\min\{P_2, P_1\}.$$

$P_1$ is the nominal transmit power corresponding to the feature information of the terminal, $P_2$ is the limiting power indicated by the configuration parameter corresponding to the feature information of the terminal, $M_1$ is a maximum power reduction (MPR) of the terminal, $M_2$ is an additional maximum power reduction (Additional Maximum Power Reduction, A-MPR) of the terminal, $M_3$ is a power management maximum power reduction (P-MPR) of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal. The MPR, A-MPR and P-MPR are different power reductions when the terminal uses different bandwidths and in cases of different modulation signals (for example, quadrature phase shift keying (QPSK), 16 quadrature amplitude modulation (QAM), and 64QAM), different adjacent channel leakage ratio (ACLR) requirements, different out-of-band power leakage requirements, and different electromagnetic absorption requirements.

max $(M_1+M_2+\Delta T_1+\Delta T_2, M_3)$ refers to taking a larger value between $M_1+M_2+\Delta T_1+\Delta T_2$ and $M_3$; min$\{P_2-\Delta T_2, P_1-\max(M_1+M_2+\Delta T_1+\Delta T_2, M_3)\}$ refers to taking a smaller value between $P_2-\Delta T_2$ and $P_1-\max(M_1+M_2+\Delta T_1+\Delta T_2, M_3)$; and min$\{P_2, P_1\}$ refers to taking a smaller value between $P_2$ and $P_1$.

When the feature information corresponding to the N configuration parameters sent by the base station includes the feature information of the terminal, the terminal may determine the maximum transmit power according to the limiting power configured by the base station, the nominal transmit power of the terminal, the power reduction of the terminal, and the power relaxation of the terminal jointly.

It should be noted that, when the feature information is a power level, the nominal transmit power corresponding to the feature information is a nominal transmit power corresponding to the power level of the terminal; when the feature information is a service type, the nominal transmit power corresponding to the feature information is: a nominal transmit power corresponding to a power level when the terminal uses a service corresponding to the service type.

The terminal may have multiple power levels, for example, in a period of time, the power level of the terminal is class 1, and in another period of time, the terminal may switch the power level to class 2. Different power levels correspond to different nominal transmit powers. When the feature information of the terminal includes a power level, the terminal determines the maximum transmit power according to the power level.

Similarly, the terminal may also support multiple different service types, and different from power levels, multiple types of services may be supported by the terminal at the same time. When the feature information of the terminal includes a service type, the terminal determines the maximum transmit power according to a power level when the terminal uses a service corresponding to the service type.

Step 208: The terminal determines a candidate limiting power according to a preset policy, and determines, according to at least the candidate limiting power and a nominal transmit power corresponding to the feature information of the terminal, a maximum transmit power corresponding to the feature information of the terminal.

When the terminal corresponds to multiple pieces of feature information and the base station does not set limiting powers for the multiple pieces of feature information, the terminal may separately determine maximum transmit powers for the multiple pieces of feature information, and the determined maximum transmit powers are used correspondingly for respective feature information.

The terminal may determine the candidate limiting power by using the following four methods.

1) The terminal determines that the nominal transmit power corresponding to the feature information of the terminal is the candidate limiting power. When the maximum transmit power corresponding to the feature information of the terminal is determined according to the candidate limiting power, a determined range of the maximum transmit power is [Pi, Pj]; the lower limit of the maximum transmit power is Pi, and the upper limit of the maximum transmit power is Pj.

$Pi = P_1 - \max(M_1 + M_2 + \Delta T_1 + \Delta T_2, M_3)$; $Pj = P_1$; $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

In this embodiment, in one method for determining the candidate limiting power, it is determined that the nominal transmit power corresponding to the power level or the service type of the terminal is the candidate limiting power, that is, the base station does not limit the maximum transmit power corresponding to the feature information of the terminal, and the terminal sets, according to only the nominal transmit power determined by a hardware capability or the supported service type of the terminal, the range of the maximum transmit power corresponding to the feature information of the terminal.

2) The terminal determines that the candidate limiting power is 0, and determines that the maximum transmit power corresponding to the feature information of the terminal is 0.

In this embodiment, in another method for determining the candidate limiting power, the candidate limiting power is set to 0, that is, it is determined that the maximum transmit power of the terminal is 0, in other words, when the base station does not set the limiting power for the feature information of the terminal, the terminal does not send uplink signals to the base station. For example, if the base station does not set a limiting power for power level class 2, when the power level of the terminal is in class 2, the terminal does not send uplink signals to the base station; or if the base station does not set a limiting power for a device to device (D2D) service, when the terminal performs a D2D service, the terminal does not send uplink signals related to the D2D service to the base station.

3) The terminal determines that one of the limiting powers corresponding to the N configuration parameters is the candidate limiting power. Specifically, it may be determined that a lowest power among the limiting powers corresponding to the N configuration parameters is the candidate limiting power.

In this embodiment, in another method for determining the candidate limiting power, one configuration parameter is selected from the N configuration parameters set by the base station, and the maximum transmit power of the terminal is determined with reference to a limiting power corresponding to the configuration parameter, the nominal transmit power corresponding to the feature information of the terminal, the power reduction of the terminal, and the power relaxation of the terminal. In this case, the manner in which the terminal determines the maximum transmit power corresponding to the feature information is similar to the manner of determining the range of the maximum transmit power when the feature information corresponding to the N configuration parameters set by the base station includes the feature information of the terminal, that is, a determined range of the maximum transmit power is [Pi", Pj"]; a lower limit of the maximum transmit power is Pi", and an upper limit of the maximum transmit power is Pj".

$Pi" = \min\{P_2' - \Delta T_2, P_1 - \max(M_1 + M_2 + \Delta T_1 + \Delta T_2, M_3)\}$; $Pj" = \min\{P_2', P_1\}$; $P_1$ is the nominal transmit power corresponding to the feature information of the terminal, $P_2'$ is the determined candidate limiting power, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

It should be noted that, to reduce impact of the terminal on the base station as much as possible, the terminal may select a smallest value among the N limiting powers set by the base station, to determine the maximum transmit power of the terminal. In addition, generally, the value of the limiting power set by the base station is directly proportional to the corresponding power level, that is, a higher power level indicates a higher correspondingly specified limiting power, and a lower power level indicates a lower correspondingly specified limiting power. Therefore, when the feature information is the power level of the terminal, a limiting parameter corresponding to the lowest power level among the configuration parameters may also be selected.

4) When the feature information includes power levels, the terminal selects a specified power level from the power levels corresponding to the N configuration parameters; and determines that a nominal transmit power corresponding to the specified power level is the candidate limiting power. Specifically, a lowest power level among the limiting powers corresponding to the N configuration parameters may be selected as the specified power level.

In this embodiment, in another method for determining the candidate limiting power, when the feature information of the terminal includes the power level, the terminal selects, from the power levels corresponding to the N configuration parameters configured by the base station for the terminal, a nominal transmit power corresponding to a lowest power level, and determines that the nominal transmit power corresponding to the lowest power level is the candidate limiting power. In this case, the manner in which the terminal determines the maximum transmit power corresponding to the feature information is similar to the foregoing manner of determining the range of the maximum transmit power when it is determined that one of the limiting powers corresponding to the N configuration parameters is the candidate limiting power, and details are not described herein again.

In conclusion, in the method for determining a maximum transmit power provided by this embodiment of the present invention, a terminal receives N configuration parameters sent by a base station, and if feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, in the method for determining a maximum transmit power provided by this embodiment of the present invention, the feature information may further include a service type, and the maximum transmit power can be set not only according to the power level of the terminal but also according to the service type.

Second, in the method for determining a maximum transmit power provided by this embodiment of the present invention, when the feature information corresponding to the N configuration parameters does not include the feature information of the terminal, a candidate limiting power may be further determined for the terminal according to a preset policy.

Referring to FIG. 3, FIG. 3 is a method flowchart of a method for determining a maximum transmit power according to an embodiment of the present invention. The method may be applied to a base station, to set a maximum transmit power of a terminal. The method may include the following.

Step 302: The base station determines N configuration parameters, where each of the configuration parameters is used to indicate a limiting power corresponding to one type of feature information, the feature information includes a power level or a service type, and N is not less than 1.

Step 304: The base station sends the N configuration parameters to the terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

When limiting the maximum transmit power of the terminal, the base station may separately set limiting powers for all or some of supported feature information, use the specified limiting powers and the corresponding feature information as configuration parameters, and send the configuration parameters to all terminals within coverage of the base station, so that the terminal configures the maximum transmit power according to the configuration parameter. For specific steps of configuring, by the terminal, the maximum transmit power according to the configuration parameter, refer to the description in the embodiment corresponding to FIG. 1 or FIG. 2, and details are not described herein again.

In conclusion, in the method for determining a maximum transmit power provided by this embodiment of the present invention, N configuration parameters are sent to a terminal, to instruct the terminal to set, when feature information corresponding to the N configuration parameters includes feature information of the terminal, a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, in the method for determining a maximum transmit power provided by this embodiment of the present invention, the feature information may further include a service type, and the maximum transmit power can be set not only according to the power level of the terminal but also according to the service type.

Referring to FIG. 4, FIG. 4 is a method flowchart of a method for determining a maximum transmit power according to an embodiment of the present invention. The method may be applied to a system that includes a base station and a terminal, to set a maximum transmit power of the terminal. The method may include the following.

Step 402: The base station determines N configuration parameters, where each of the configuration parameters is used to indicate a limiting power corresponding to one type of feature information.

The feature information is used to indicate a power level or a service type, and N is not less than 1.

The base station sets a limiting power according to at least one piece of feature information in advance, and uses the specified limiting power and the corresponding feature information as configuration parameters.

To further improve an effect of setting the maximum transmit power of the terminal, in this embodiment, the base station not only can set the limiting power according to a power level of the terminal, but also can set the limiting power according to a service type that may be used by the terminal. For example, the base station may configure a relatively high limiting power for a long-distance direct-connection communication service, and configure a relatively low limiting power for a short-distance direct-connection communication service.

Step 404: The base station sends the N configuration parameters to the terminal.

The base station may send, in a broadcast manner, the configuration parameters to all terminals within the coverage.

Step 406: The terminal determines whether the feature information corresponding to the N configuration parameters includes feature information of the terminal; if yes, go to step 408; otherwise, go to step 410.

When the feature information corresponding to the N configuration parameters sent by the base station includes the feature information of the terminal, go to step 408, to configure a maximum transmit power according to the limiting power corresponding to the feature information of the terminal. When the feature information corresponding to the N configuration parameters sent by the base station does not include the feature information of the terminal, the method may proceed to step 410.

Step 408: The terminal determines, according to a nominal transmit power corresponding to the feature information of the terminal and a limiting power indicated by a configuration parameter corresponding to the feature information of the terminal, a maximum transmit power corresponding to the feature information of the terminal, where the maximum transmit power is not less than a lower limit of the maximum transmit power and not greater than an upper limit of the maximum transmit power.

Specifically, the lower limit of the maximum transmit power is Pi', and the upper limit of the maximum transmit power is Pj', where $$Pi'=\min\{P_2-\Delta T_2, P_1-\max(M_1+M_2+\Delta T_1+\Delta T_2, M_3)\};$$
and
$$Pj'=\min\{P_2, P_1\}.$$

$P_1$ is the nominal transmit power corresponding to the feature information of the terminal, $P_2$ is the limiting power indicated by the configuration parameter corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal. The MPR, A-MPR and P-MPR are different power reductions when the terminal uses different bandwidths and in cases of different modulation signals, different adjacent channel leakage ratio requirements, different out-of-band power leakage requirements, and different electromagnetic absorption requirements.

max $(M_1+M_2+\Delta T_1+\Delta T_2, M_3)$ refers to taking a larger value between $M_1+M_2+\Delta T_1+\Delta T_2$ and $M_3$; min$\{P_2-\Delta T_2, P_1-\max(M_1+M_2+\Delta T_1+\Delta T_2, M_3)\}$ refers to taking a smaller value between $P_2-\Delta T_2$ and $P_1-\max(M_1+M_2+\Delta T_1+\Delta T_2, M_3$; and min$\{P_2, P\}1$ refers to taking a smaller value between $P_2$ and $P_1$.

When the feature information corresponding to the N configuration parameters sent by the base station includes the feature information of the terminal, the terminal may determine the maximum transmit power according to the limiting power configured by the base station, the nominal transmit power corresponding to the feature information of the terminal, the power reduction of the terminal, and the power relaxation of the terminal jointly.

It should be noted that, when the feature information is a power level, the nominal transmit power corresponding to the feature information is a nominal transmit power corresponding to the power level of the terminal; when the feature information is a service type, the nominal transmit power corresponding to the feature information is: a nominal transmit power corresponding to a power level when the terminal uses a service corresponding to the service type.

The terminal may have multiple power levels, for example, in a period of time, the power level of the terminal is class 1, and in another period of time, the terminal may switch the power level to class 2. Different power levels correspond to different nominal transmit powers. When the feature information of the terminal includes a power level, the terminal determines the maximum transmit power according to the power level.

Similarly, the terminal may also support multiple different service types, and different from power levels, multiple types of services may be supported by the terminal at the same time. When the feature information of the terminal includes a service type, the terminal determines the maximum transmit power according to a power level when the terminal uses a service corresponding to the service type.

Step 410: The terminal determines a candidate limiting power according to a preset policy, and determines, according to at least the candidate limiting power and a nominal transmit power corresponding to the feature information of the terminal, a maximum transmit power corresponding to the feature information of the terminal.

When the terminal corresponds to multiple pieces of feature information and the base station does not set limiting powers for the multiple pieces of feature information, the terminal may separately determine maximum transmit powers for the multiple pieces of feature information, and the determined maximum transmit powers are used correspondingly for respective feature information.

The terminal may determine the candidate limiting power by using the following four methods:

1) The terminal determines that the nominal transmit power corresponding to the feature information of the terminal is the candidate limiting power. When the maximum transmit power corresponding to the feature information of the terminal is determined according to the candidate limiting power, it is determined that a range of the maximum transmit power corresponding to the feature information of the terminal is [Pi, Pj]; the lower limit of the maximum transmit power is Pi, and the upper limit of the maximum transmit power is Pj.

$Pi=P_1-\max(M_1+M_2+\Delta T_1+\Delta T_2, M_3)$; $Pj=P_1$; $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

In this embodiment, in one method for determining the candidate limiting power, it is determined that the nominal transmit power corresponding to the power level or the service type of the terminal is the candidate limiting power, that is, the base station does not limit the maximum transmit power corresponding to the feature information of the terminal, and the terminal sets, according to only the nominal transmit power determined by a hardware capability or the supported service type of the terminal, the range of the maximum transmit power corresponding to the feature information of the terminal.

2) The terminal determines that the candidate limiting power is 0, and determines that the maximum transmit power corresponding to the feature information of the terminal is 0.

In this embodiment, in another method for determining the candidate limiting power, the candidate limiting power is set to 0, that is, it is determined that the maximum transmit power of the terminal is 0, in other words, when the base station does not set the limiting power for the feature information of the terminal, the terminal does not send uplink signals to the base station. For example, if the base station does not set a limiting power for power level class 2, when the power level of the terminal is in class 2, the terminal does not send uplink signals to the base station; or if the base station does not set a limiting power for a device to device service, when the terminal performs a D2D service, the terminal does not send uplink signals related to the D2D service to the base station.

3) The terminal determines that one of the limiting powers corresponding to the N configuration parameters is the candidate limiting power. Specifically, it may be determined that a lowest power among the limiting powers corresponding to the N configuration parameters is the candidate limiting power.

In this embodiment, in another method for determining the candidate limiting power, one configuration parameter is selected from the N configuration parameters set by the base station, and the maximum transmit power of the terminal is determined with reference to a limiting power corresponding to the configuration parameter, the nominal transmit power corresponding to the feature information of the terminal, the power reduction of the terminal, and the power relaxation of the terminal. In this case, the manner in which the terminal determines the maximum transmit power corresponding to the feature information is similar to the manner of determining the range of the maximum transmit power when the feature information corresponding to the N configuration parameters set by the base station includes the feature information of the terminal, that is, it is determined that the range of the maximum transmit power corresponding to the feature information of the terminal is [Pi″, Pj″ ]; a lower limit of the maximum transmit power is Pi″, and an upper limit of the maximum transmit power is Pj″.

Pi″=min{$P_2$′−$\Delta T_2$, $P_1$−max($M_1$+$M_2$+$\Delta T_1$+$\Delta T_2$, $M_3$)}; Pj″=min{$P_2$′, $P_1$}; $P_1$ is the nominal transmit power corresponding to the feature information of the terminal, $P_2$′ is the determined candidate limiting power, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

It should be noted that, to reduce impact of the terminal on the base station as much as possible, the terminal may select a smallest value among the N limiting powers set by the base station, to determine the maximum transmit power of the terminal. In addition, generally, the value of the limiting power set by the base station is directly proportional to the corresponding power level, that is, a higher power level indicates a higher correspondingly specified limiting power, and a lower power level indicates a lower correspondingly specified limiting power. Therefore, when the feature information is the power level of the terminal, a limiting parameter corresponding to the lowest power level among the configuration parameters may also be selected.

4) When the feature information includes power levels, the terminal selects a specified power level from the power levels corresponding to the N configuration parameters; and determines that a nominal transmit power corresponding to the specified power level is the candidate limiting power. Specifically, a lowest power level among the limiting powers corresponding to the N configuration parameters may be selected as the specified power level.

In this embodiment, in another method for determining the candidate limiting power, when the feature information of the terminal includes the power level, a nominal transmit power corresponding to a lowest power level is selected from the power levels corresponding to the N configuration parameters configured by the base station for the terminal, and it is determined that the nominal transmit power corresponding to the lowest power level is the candidate limiting power. In this case, the manner in which the terminal determines the maximum transmit power corresponding to the feature information is similar to the foregoing manner of determining the range of the maximum transmit power when it is determined that one of the limiting powers corresponding to the N configuration parameters is the candidate limiting power, and details are not described herein again.

In conclusion, in the method for determining a maximum transmit power provided by this embodiment of the present invention, a terminal receives N configuration parameters sent by a base station, and if feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, in the method for determining a maximum transmit power provided by this embodiment of the present invention, the feature information may further include a service type, and the maximum transmit power can be set not only according to the power level of the terminal but also according to the service type.

Second, in the method for determining a maximum transmit power provided by this embodiment of the present invention, when the feature information corresponding to the N configuration parameters does not include the feature information of the terminal, a candidate limiting power may be further determined for the terminal according to a preset policy.

Figure 5:
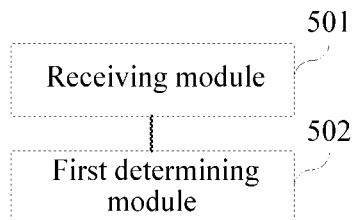
FIG. 5 is a schematic structural diagram of a terminal according to an embodiment of the present invention.

Referring to FIG. 5, FIG. 5 is a schematic structural diagram of a terminal according to an embodiment of the present invention. The terminal may be user equipment (UE), and the terminal may include: a receiving module 501, configured to receive N configuration parameters sent by a base station, where each of the configuration parameters is used to indicate a limiting power corresponding to one type of feature information, the feature information includes a power level or a service type, and N is not less than 1; and a first determining module 502, configured to: when the feature information indicated by the N configuration parameters includes feature information of the terminal, determine a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

In conclusion, the terminal provided by this embodiment of the present invention receives N configuration parameters sent by a base station, and when feature information corresponding to the N configuration parameters includes feature information of the terminal, sets a maximum transmit power corresponding to the feature information according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, for the terminal provided by this embodiment of the present invention, the feature information may further include a service type, and the maximum transmit power can be set not only according to the power level of the terminal but also according to the service type.

Figure 6:
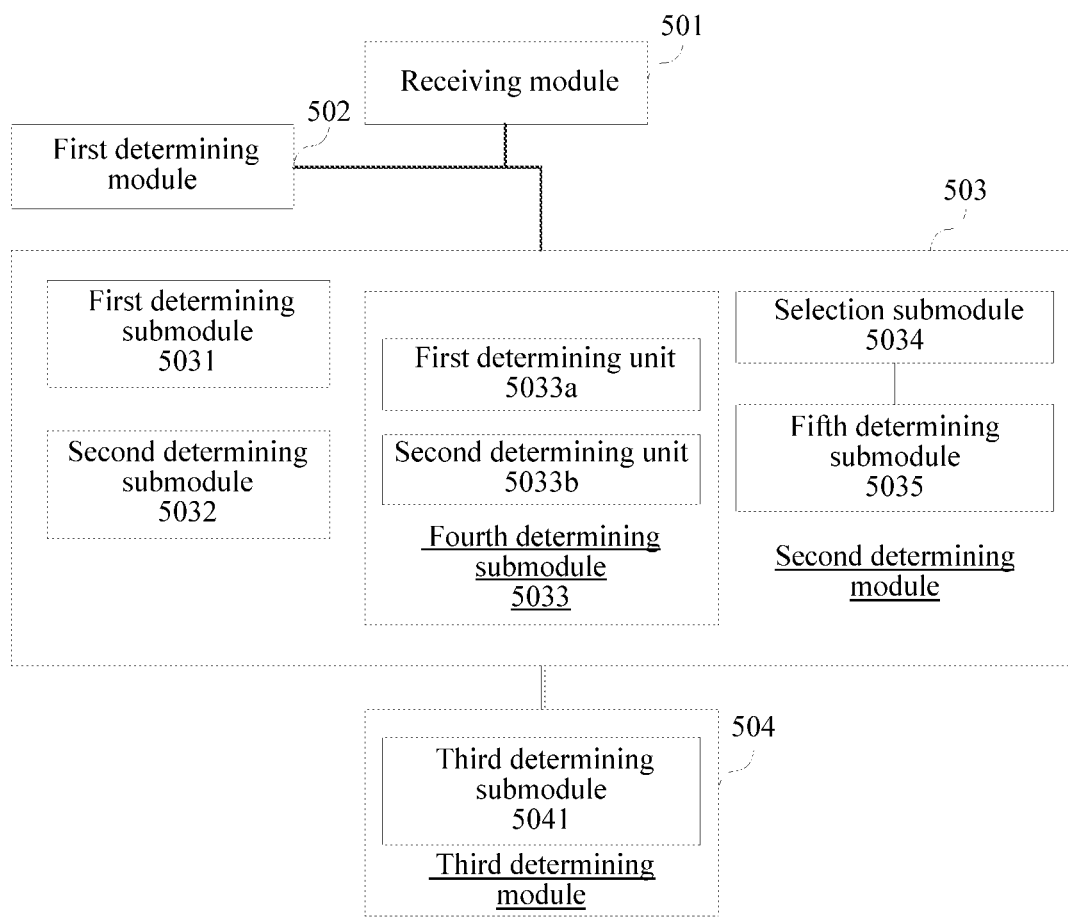
FIG. 6 is a schematic structural diagram of a terminal according to another embodiment of the present invention.

As a further detailed description about the foregoing embodiment shown in FIG. 5, referring to FIG. 6, FIG. 6 is a schematic structural diagram of a terminal according to another embodiment of the present invention. The terminal may be user equipment (UE), and the terminal may include: a receiving module 501, configured to receive N configuration parameters sent by a base station, where each of the configuration parameters is used to indicate a limiting power corresponding to one type of feature information, the feature information includes a power level or a service type, and N is not less than 1; and a first determining module 502, configured to: when the feature information indicated by the N configuration parameters includes feature information of the terminal, determine a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

Specifically, the first determining module 502 is specifically configured to determine that a range of the maximum transmit power corresponding to the feature information of the terminal is [Pi', Pj']; the lower limit of the maximum transmit power is Pi', and the upper limit of the maximum transmit power is Pj', where $$Pi'=\min\{P_2-\Delta T_2, P_1-\max(M_1+M_2+\Delta T_1+\Delta T_2, M_3)\};$$
and $$Pj'=\min\{P_2, P_1\},$$

where $P_1$ is the nominal transmit power corresponding to the feature information of the terminal, $P_2$ is the limiting power indicated by the configuration parameter corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

Further, the terminal further includes: a second determining module 503, configured to: when the feature information corresponding to the N configuration parameters does not include the feature information of the terminal, determine a candidate limiting power according to a preset policy; and a third determining module 504, configured to determine the maximum transmit power according to at least the candidate limiting power and the nominal transmit power corresponding to the feature information of the terminal.

Optionally, the second determining module 503 includes: a first determining submodule 5031, configured to determine that the nominal transmit power corresponding to the feature information of the terminal is the candidate limiting power.

Optionally, the lower limit of the maximum transmit power is Pi, and the upper limit of the maximum transmit power is Pj, where $Pi=P_1-\max(M_1+M_2+\Delta T_1+\Delta T_2, M_3)$, $Pj=P_1$, $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

Optionally, the second determining module 503 includes: a second determining submodule 5032, configured to determine that the candidate limiting power is 0.

The third determining module 504 includes: a third determining submodule 5041, configured to determine that the maximum transmit power corresponding to the feature information of the terminal is 0.

Optionally, the second determining module 503 includes: a fourth determining submodule 5033, configured to determine that one of the limiting powers corresponding to the N configuration parameters is the candidate limiting power.

Further, the fourth determining submodule 5033 includes: a first determining unit 5033a or a second determining unit 5033b, where the first determining unit 5033a is configured to determine that a lowest power among the limiting powers corresponding to the N configuration parameters is the candidate limiting power; and the second determining unit 5033b is configured to: when the feature information includes power levels, determine that a limiting power corresponding to a lowest power level among the limiting powers corresponding to the N configuration parameters is the candidate limiting power.

Optionally, the second determining module 503 includes: a selection submodule 5034, configured to: when the feature information includes power levels, select a specified power level from the power levels corresponding to the N configuration parameters; and a fifth determining submodule 5035, configured to determine that a nominal transmit power corresponding to the specified power level is the candidate limiting power.

The selection submodule 5034 is configured to select a lowest power level among the limiting powers corresponding to the N configuration parameters as the specified power level.

In conclusion, the terminal provided by this embodiment of the present invention receives N configuration parameters sent by a base station, and if feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, for the terminal provided by this embodiment of the present invention, the feature information may further include a service type, and the maximum transmit power can be set not only according to the power level of the terminal but also according to the service type.

Second, for the terminal provided by this embodiment of the present invention, when the feature information corresponding to the N configuration parameters does not include the feature information of the terminal, a candidate limiting power may be further determined for the terminal according to a preset policy.

Figure 7:
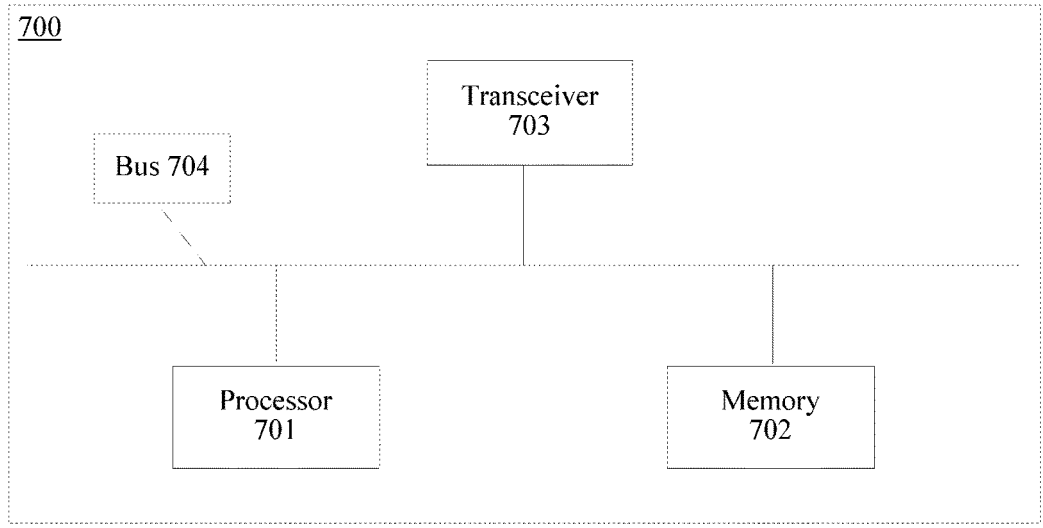
FIG. 7 is a block diagram of a terminal according to an embodiment of the present invention.

Referring to FIG. 7, FIG. 7 is a block diagram of a terminal 700 according to an embodiment of the present invention. The terminal 700 may be a user terminal UE, and the terminal 700 may include: a bus 704, and a processor 701, a memory 702, and a transceiver 703 that are connected to the bus. The memory 702 is configured to store instructions, and the instructions are configured to be executed by the processor.

The transceiver 703 is configured to receive N configuration parameters sent by a base station, where each of the configuration parameters is used to indicate a limiting power corresponding to one type of feature information, the feature information is used to indicate a power level or a service type, and N is not less than 1.

The processor 701 is configured to: when the feature information indicated by the N configuration parameters includes feature information of the terminal, determine a maximum transmit power of the terminal according to at least a nominal transmit power corresponding to the feature information of the terminal and a limiting power indicated by the configuration parameter corresponding to the feature information of the terminal, where the maximum transmit power is not less than a lower limit of the maximum transmit power and not greater than an upper limit of the maximum transmit power.

In conclusion, the terminal provided by this embodiment of the present invention receives N configuration parameters sent by a base station, and if feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, for the terminal provided by this embodiment of the present invention, the feature information may further include a service type, and the maximum transmit power can be set not only according to the power level of the terminal but also according to the service type.

Figure 8:
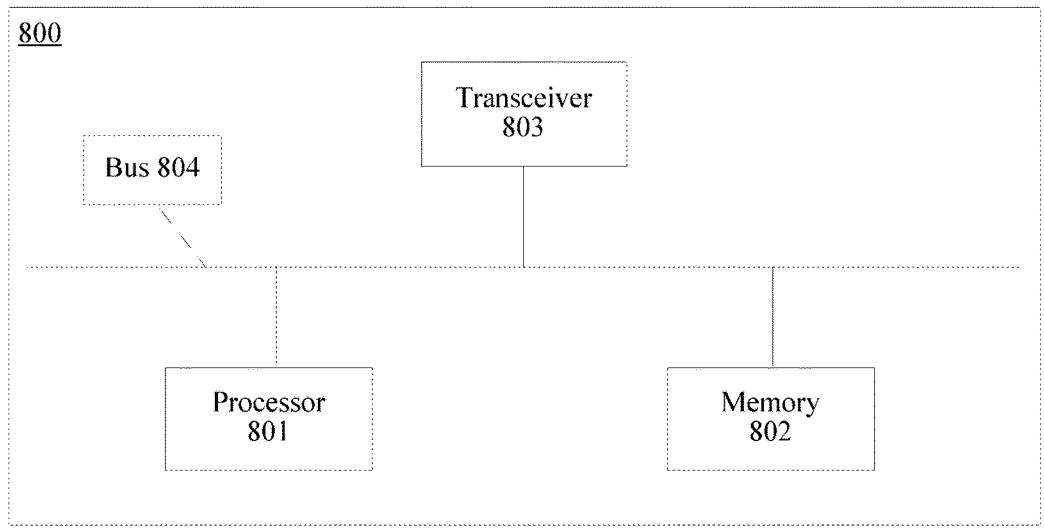
FIG. 8 is a block diagram of a terminal according to another embodiment of the present invention.

As a further detailed description of the foregoing embodiment shown in FIG. 7, referring to FIG. 8, FIG. 8 is a block diagram of a terminal 800 according to an embodiment of the present invention. The terminal 800 may be user equipment (UE), and the terminal 800 may include: a bus 804, and a processor 801, a memory 802, and a transceiver 803 that are connected to the bus. The memory 802 is configured to store instructions, and the instructions are configured to be executed by the processor.

The transceiver 803 is configured to receive N configuration parameters sent by a base station, where each of the configuration parameters is used to indicate a limiting power corresponding to one type of feature information, the feature information is used to indicate a power level or a service type, and N is not less than 1.

The processor 801 is configured to: when the feature information indicated by the N configuration parameters includes feature information of the terminal, determine a maximum transmit power of the terminal according to at least a nominal transmit power corresponding to the feature information of the terminal and a limiting power indicated by the configuration parameter corresponding to the feature information of the terminal, where the maximum transmit power is not less than a lower limit of the maximum transmit power and not greater than an upper limit of the maximum transmit power.

Optionally, the processor 801 is further configured to: when the feature information corresponding to the N configuration parameters does not include the feature information of the terminal, determine a candidate limiting power according to a preset policy, and determine the maximum transmit power according to at least the candidate limiting power and the nominal transmit power corresponding to the feature information of the terminal.

The processor 801 is further configured to determine that the nominal transmit power corresponding to the feature information of the terminal is the candidate limiting power.

The lower limit of the maximum transmit power is Pi, and the upper limit of the maximum transmit power is Pj, where $Pi=P_1-\max(M_1+M_2+\Delta T_1+\Delta T_2, M_3)$, $Pj=P_1$, $P_1$ is the nominal transmit power corresponding to the feature information of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

Optionally, the processor 801 is further configured to determine that the candidate limiting power is 0.

The processor 801 is further configured to determine that the maximum transmit power is 0.

Optionally, the processor 801 is further configured to determine that one of the limiting powers corresponding to the N configuration parameters is the candidate limiting power.

The processor 801 is further configured to determine that a lowest power among the limiting powers corresponding to the N configuration parameters is the candidate limiting power; or when the feature information includes power levels, determine that a limiting power corresponding to a lowest power level among the limiting powers corresponding to the N configuration parameters is the candidate limiting power.

Optionally, the processor 801 is further configured to: when the feature information includes power levels, select a specified power level from the power levels corresponding to the N configuration parameters; and determine that a nominal transmit power corresponding to the specified power level is the candidate limiting power.

The processor 801 is further configured to select a lowest power level among the limiting powers corresponding to the N configuration parameters as the specified power level.

Optionally, the lower limit of the maximum transmit power is Pi', and the upper limit of the maximum transmit power is Pj', where $Pi'=\min\{P_2-\Delta T_2, P_1-\max(M_1+M_2+\Delta T_1+\Delta T_2, M_3)\}$; and $Pj'=\min\{P_2, P_1\}$, where $P_1$ is the nominal transmit power corresponding to the feature information of the terminal, $P_2$ is the limiting power indicated by the configuration parameter corresponding to the power level of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

In conclusion, the terminal provided by this embodiment of the present invention receives N configuration parameters sent by a base station, and if feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, for the terminal provided by this embodiment of the present invention, the feature information may further include a service type, and the maximum transmit power can be set not only according to the power level of the terminal but also according to the service type.

Second, for the terminal provided by this embodiment of the present invention, when the feature information corresponding to the N configuration parameters does not include the feature information of the terminal, a candidate limiting power may be further determined for the terminal according to a preset policy.

Figure 9:
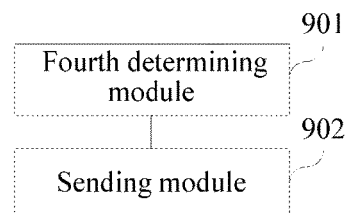
FIG. 9 is a schematic structural diagram of a base station according to an embodiment of the present invention.

Referring to FIG. 9, FIG. 9 is a schematic structural diagram of a base station according to an embodiment of the present invention. The base station may be used to limit a maximum transmit power of a terminal. The base station may include: a fourth determining module 901, configured to determine N configuration parameters, where each of the configuration parameters is used to indicate a limiting power corresponding to one type of feature information, the feature information is used to indicate a power level or a service type, and N is not less than 1; and a sending module 902, configured to send the N configuration parameters to a terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

When limiting the maximum transmit power of the terminal, the base station may separately set limiting powers for all or some of supported feature information, use the specified limiting powers and the corresponding feature information as configuration parameters, and send the configuration parameters to all terminals within coverage of the base station, so that the terminal configures the maximum transmit power according to the configuration parameter. For specific steps of configuring, by the terminal, the maximum transmit power according to the configuration parameter, refer to the description in the embodiment corresponding to FIG. 1 or FIG. 2, and details are not described herein again.

In conclusion, the base station provided by this embodiment of the present invention sends N configuration parameters to a terminal, and when feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, for the base station provided by this embodiment of the present invention, the feature information may further include a service type, and the maximum transmit power can be set not only according to the power level of the terminal but also according to the service type.

Figure 10:
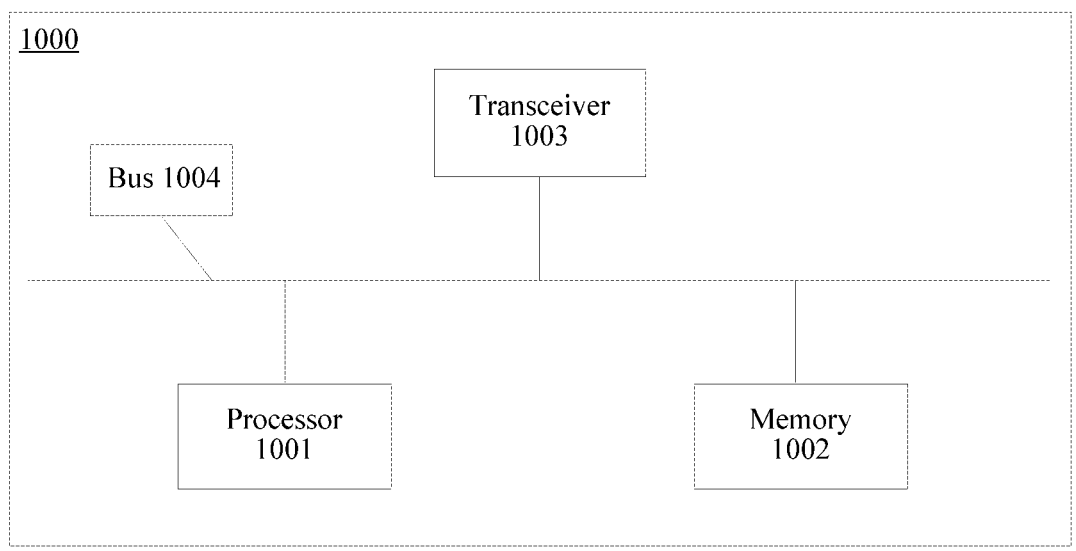
FIG. 10 is a block diagram of a base station according to an embodiment of the present invention.

Referring to FIG. 10, FIG. 10 is a block diagram of a base station 1000 according to an embodiment of the present invention. The base station 1000 may be used to limit a maximum transmit power of a terminal. The base station 1000 may include: a bus 1004, and a processor 1001, a memory 1002, and a transceiver 1003 that are connected to the bus. The memory 1002 is configured to store instructions, and the instructions are configured to be executed by the processor.

The processor 1001 is configured to determine N configuration parameters, where each of the configuration parameters is used to indicate a limiting power corresponding to one type of feature information, the feature information is used to indicate a power level or a service type, and N is not less than 1.

The processor 1001 is configured to control the transceiver 1003 to send the N configuration parameters to a terminal, where the N configuration parameters trigger the terminal to determine, when the feature information indicated by the N configuration parameters includes feature information of the terminal, a maximum transmit power of the terminal according to at least a nominal transmit power corresponding to the feature information of the terminal and a limiting power indicated by a configuration parameter corresponding to the feature information of the terminal, where the maximum transmit power is not less than a lower limit of the maximum transmit power and not greater than an upper limit of the maximum transmit power.

In conclusion, the base station provided by this embodiment of the present invention sends N configuration parameters to a terminal, and when feature information corresponding to the N configuration parameters includes feature information of the terminal, the terminal sets a maximum transmit power according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels.

Moreover, for the base station provided by this embodiment of the present invention, the feature information may further include a service type, and the maximum transmit power can be set not only according to the power level of the terminal but also according to the service type.

Figure 11:
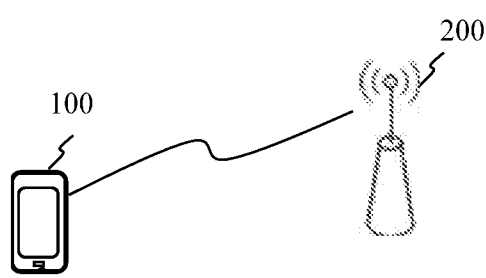
FIG. 11 is a system composition diagram of a system for determining a maximum transmit power according to an embodiment of the present invention.

Referring to FIG. 11, FIG. 11 is a system composition diagram of a system for determining a maximum transmit power according to an embodiment of the present invention. The system may be used to set a maximum transmit power corresponding to feature information of a terminal. The system may include: a terminal 100 and a base station 200.

The base station 200 is the terminal described in the foregoing method and apparatus embodiments; and the base station 200 is the base station described in the foregoing method and apparatus embodiments.

In conclusion, in the system for determining a maximum transmit power provided by this embodiment of the present invention, the base station receives N configuration parameters sent by the base station, and if feature information corresponding to the N configuration parameters includes feature information of the terminal, a maximum transmit power is set according to a limiting power corresponding to the feature information of the terminal, which can implement that an expected effect, that is, extending a transmission distance of an uplink signal as much as possible and reducing interference from the uplink signal to the base station as much as possible, is still achieved when the base station sets limiting powers for multiple UEs having different power levels or service types.

Moreover, in the system for determining a maximum transmit power provided by this embodiment of the present invention, the feature information may further include a service type, and the maximum transmit power can be set not only according to the power level of the terminal but also according to the service type.

Second, in the system for determining a maximum transmit power provided by this embodiment of the present invention, when the feature information corresponding to the N configuration parameters does not include the feature information of the terminal, a candidate limiting power may be further determined for the terminal according to a preset policy.

It should be noted that, when the terminal and the base station provided by the foregoing embodiments set a maximum transmit power of the terminal, the foregoing functional module division is merely used as an example for description. In an actual application, the foregoing functions may be allocated to and completed by different functional modules, that is, an internal structure of the terminal or the base station is divided into different functional modules, to complete all or some of the functions described above. In addition, the terminal and the base station provided by the foregoing embodiments and the embodiments of the method for determining a maximum transmit power belong to a same thought. For a specific implementation process, refer to the method embodiments, and details are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method, comprising:
   receiving, by a terminal, one or more configuration parameters sent by a base station, wherein each of the one or more configuration parameters comprises:
      a terminal attribute, wherein the terminal attribute comprises a power class type or a service type; and
      a power limit corresponding to the terminal attribute;
   determining, by the terminal, whether at least one terminal attribute comprised by the one or more configuration parameters matches a terminal attribute of the terminal;
   in response to determining that at least one terminal attribute comprised by the one or more configuration parameters matches the terminal attribute of the terminal, determining, by the terminal, a maximum transmit power for the terminal, the maximum transmit power being determined according to at least one power limit corresponding to the at least one terminal attribute, and according to a nominal transmit power of the terminal, wherein the maximum transmit power is not less than a lower limit of the maximum transmit power and not greater than an upper limit of the maximum transmit power; and
   in response to determining that no terminal attribute comprised in the one or more configuration parameters matches the terminal attribute of the terminal, determining, by the terminal, the maximum transmit power for the terminal according to a candidate power limit indicated by a preset policy, and
   the nominal transmit power of the terminal.

2. The method according to claim 1, wherein the candidate power limit indicated by the preset policy is the nominal transmit power of the terminal.

3. The method according to claim 2, wherein the lower limit of the maximum transmit power is $P_i$, and the upper limit of the maximum transmit power is $P_j$, wherein $P_i=P_1-\max(M_1+M_2+\Delta T_1+\Delta T_2, M_3)$, $P_j=P_1$, $P_1$ is the nominal transmit power of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

4. The method according to claim 1, wherein the candidate power limit indicated by the preset policy is 0.

5. The method according to claim 1, wherein determining the maximum transmit power according to the at least one power limit corresponding to the at least one terminal attribute, and according to the nominal transmit power of the terminal, comprises:
   determining, by the terminal, that the maximum transmit power is 0.

6. The method according to claim 1, further comprising:
   determining that a first power limit corresponding to a first terminal attribute of the one or more configuration parameters is the candidate power limit.

7. The method according to claim 6, further comprising:
   determining that a lowest power limit indicated by at least one configuration parameter of the one or more configuration parameters is the first power limit; or when a terminal attribute of at least one configuration parameter of the one or more configuration parameters comprises the power class type;
   determining a lowest power class type of the at least one configuration parameter; and
   determining that a power limit corresponding to the lowest power class type is the first power limit.

8. The method according to claim 1, further comprising:
when a terminal attribute of at least one configuration parameter of the one or more configuration parameters comprises the power class type, selecting a first power class type from the at least one configuration parameter, according to the preset policy; and determining that a power limit corresponding to the first power class type is the candidate power limit.

9. The method according to claim 8, wherein selecting the first power class type comprises:
   selecting a lowest power class type from the at least one configuration parameter as the first power class type.

10. The method according to claim 1, wherein the lower limit of the maximum transmit power is $P_i'$, and the upper limit of the maximum transmit power is $P_j'$, wherein $$P_i' = \min\{P_2 - \Delta T_2, P_1 - \max(M_1 + M_2 + \Delta T_1 + \Delta T_2, M_3)\};$$
and
$$P_j' = \min\{P_2, P_1\},$$

wherein $P_1$ is the nominal transmit power of the terminal, $P_2$ is the at least one power limit corresponding to the at least one terminal attribute, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$, is an allowed operating band edge transmission power relaxation of an uplink signal of the terminal.

11. A terminal, comprising:
a bus;
a processor, coupled to the bus;
a transceiver, coupled to the bus, and configured to receive N configuration parameters sent by a base station, wherein N is an integer greater than or equal to 1, and wherein each configuration parameter of the N configuration parameters comprises:
   a terminal attribute, wherein the terminal attribute comprises a power class type or a service type; and
   a power limit corresponding to the terminal attribute; and
a non-transitory computer-readable storage medium storing a program to be executed by the processor, the program including instructions for:
   determining whether at least one terminal attribute comprised in the N configuration parameters matches a terminal attribute of the terminal;
   in response to determining that at least one terminal attribute comprised in the N configuration parameters matches the terminal attribute of the terminal, determining a maximum transmit power of the terminal, the maximum transmit power being determined according to at least one power limit corresponding to the at least one terminal attribute, and according to a nominal transmit power of the terminal, wherein the maximum transmit power is not less than a lower limit of the maximum transmit power and not greater than an upper limit of the maximum transmit power; and in response to determining that no terminal attribute comprised in the N configuration parameters match the terminal attribute of the terminal, determining the maximum transmit power for the terminal according to a candidate power limit indicated by a preset policy, and the nominal transmit power of the terminal.

12. The terminal according to claim 11, wherein the candidate power limit indicated by the preset policy is the nominal transmit power of the terminal.

13. The terminal according to claim 12, wherein the lower limit of the maximum transmit power is $P_i$, and the upper limit of the maximum transmit power is $P_j$, wherein $P_i = P_1 - \max(M_1 + M_2 + \Delta T_1 + \Delta T_2, M_3)$, $P_j = P_1$, $P_1$ is the nominal transmit power of the terminal, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

14. The terminal according to claim 11, wherein the program includes further instructions for:
   determining that the candidate power limit indicated by the preset policy is 0.

15. The terminal according to claim 11, wherein the program includes further instructions for:
   determining that the maximum transmit power is 0.

16. The terminal according to claim 11, wherein the program includes further instructions for:
   determining that a first power limit corresponding to a first terminal attribute of the N configuration parameters is the candidate power limit.

17. The terminal according to claim 16, wherein the program includes further instructions for:
   determining that a lowest power limit indicated by at least one configuration parameter of the N configuration parameters is the first power limit; or
   when a terminal attribute of at least one configuration parameter of the N configuration parameters comprises the power class type:
      determining a lowest power class type of the at least one configuration parameter; and
      determining that a power limit corresponding to the lowest power class type is the candidate power limit.

18. The terminal according to claim 11, wherein the program includes further instructions for:
   when a terminal attribute of at least one configuration parameter of the N configuration parameters comprises the power class type:
      selecting a first power class type from the at least one configuration parameter, according to the preset policy; and
      determining that a power limit corresponding to the first power class type is the candidate power limit.

19. The terminal according to claim 18, wherein the program includes further instructions for:
   selecting a lowest power class type from the at least one configuration parameter as the first power class type.

20. The terminal according to claim 11, wherein the lower limit of the maximum transmit power is $P_i'$, and the upper limit of the maximum transmit power is $P_j'$, wherein $$P_i' = \min\{P_2 - \Delta T_2, P_1 - \max(M_1 + M_2 + \Delta T_1 + \Delta T_2, M_3)\};$$
and
$$P_j' = \min\{P_2, P_1\},$$

wherein $P_1$ is the nominal transmit power of the terminal, $P_2$ is the at least one power limit corresponding to the at least one terminal attribute, $M_1$ is a maximum power reduction of the terminal, $M_2$ is an additional maximum power reduction of the terminal, $M_3$ is a power management maximum power reduction of the terminal, $\Delta T_1$ is an allowed maximum configured output power relaxation due to support for inter-band CA operation of the terminal, and $\Delta T_2$ is an allowed operating band edge transmission power relaxation of an uplink signal of the terminal.

* * * * *